United States Patent [19]

Ackeret

[11] Patent Number: 4,650,072

[45] Date of Patent: Mar. 17, 1987

[54] MAGAZINE FOR SOUND RECORDING MEDIA

[75] Inventor: Peter Ackeret, Kusnacht, Switzerland

[73] Assignee: IDN Inventions and Development of Novities, Hartberts, Switzerland

[21] Appl. No.: 645,069

[22] Filed: Aug. 28, 1984

[30] Foreign Application Priority Data

Aug. 29, 1983 [EP] European Pat. Off. ........ 83108474.4

[51] Int. Cl.$^4$ ..................... B65D 85/02; B65D 85/672
[52] U.S. Cl. .................................. 206/307; 206/309; 206/387; 211/40; 224/42.45 R; 312/12; 312/248
[58] Field of Search ............... 206/309, 387, 444, 307; 211/115, 116, 40; 248/178, 179, 213.2, 213.3, 278, 281.1, 282, 284, 311.2, 311.3; 312/248, 251–253, 327, 328, 8–12; 224/42.45 R, 42.42 R

[56] References Cited

U.S. PATENT DOCUMENTS

| | | | |
|---|---|---|---|
| 2,694,585 | 11/1954 | Fiori .................................... | 248/284 |
| 2,966,257 | 12/1960 | Littlejohn ........................... | 312/253 |
| 3,008,259 | 11/1961 | Zornes ................................ | 248/284 |
| 3,443,851 | 5/1969 | Earl .................................... | 312/245 |
| 3,685,708 | 8/1972 | Herrington .................. | 224/42.45 R |
| 3,752,551 | 8/1973 | Clark .................................. | 206/387 |
| 3,964,612 | 6/1976 | Skilliter, Jr. et al. ........ | 224/42.42 R |
| 4,191,351 | 3/1980 | Goyne .............................. | 248/311.2 |
| 4,231,625 | 11/1980 | Perez et al. ......................... | 312/245 |
| 4,258,961 | 3/1981 | Ackeret ................................. | 312/10 |
| 4,453,785 | 6/1984 | Smith ................................... | 312/12 |

FOREIGN PATENT DOCUMENTS 2757249 7/1979 Fed. Rep. of Germany ...... 206/387
2021072 11/1979 United Kingdom ................ 206/387

Primary Examiner—William Price
Assistant Examiner—Jimmy G. Foster
Attorney, Agent, or Firm—Prutzman, Kalb, Chilton & Alix

[57] ABSTRACT

A magazine for sound recording media suitable for vehicle installation comprises an outer housing which defines, through the use of a plurality of inwardly extending ribs, a recess which receives the inner housing or housings which include the media receiving drawers or sliders. An impact absorbing frame is provided around the access opening at the front of the outer housing. The outer housing is mounted, by means of integral hubs, from a support by means of a yoke. The hubs are relatively rotatable with respect to the yoke to permit the outer housing to be positioned in a desired angular orientation.

21 Claims, 4 Drawing Figures

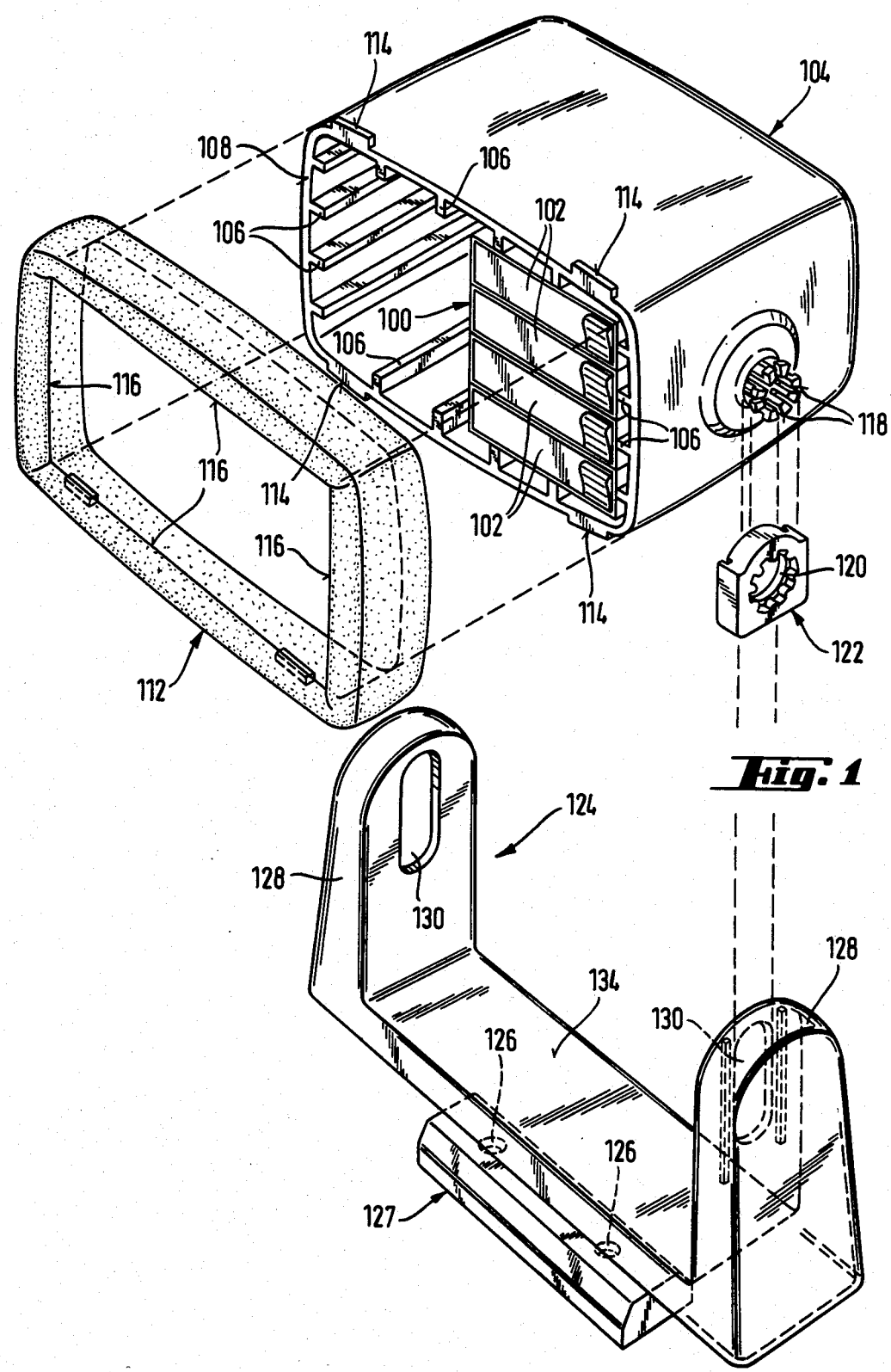

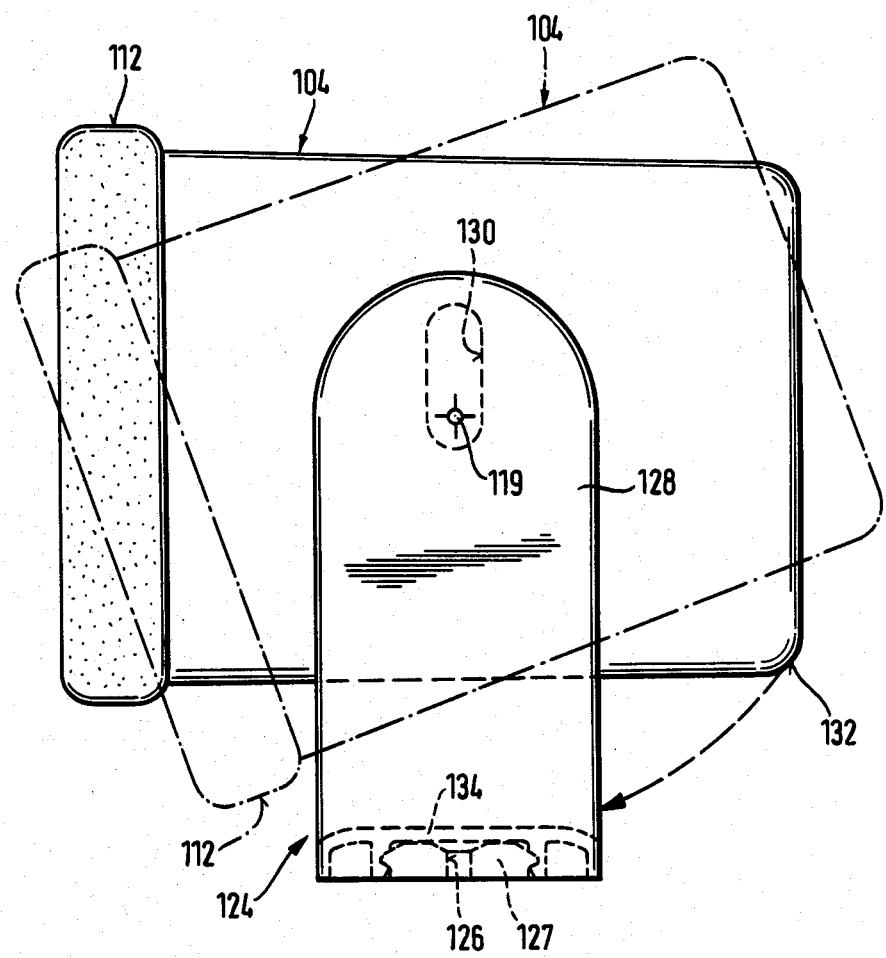

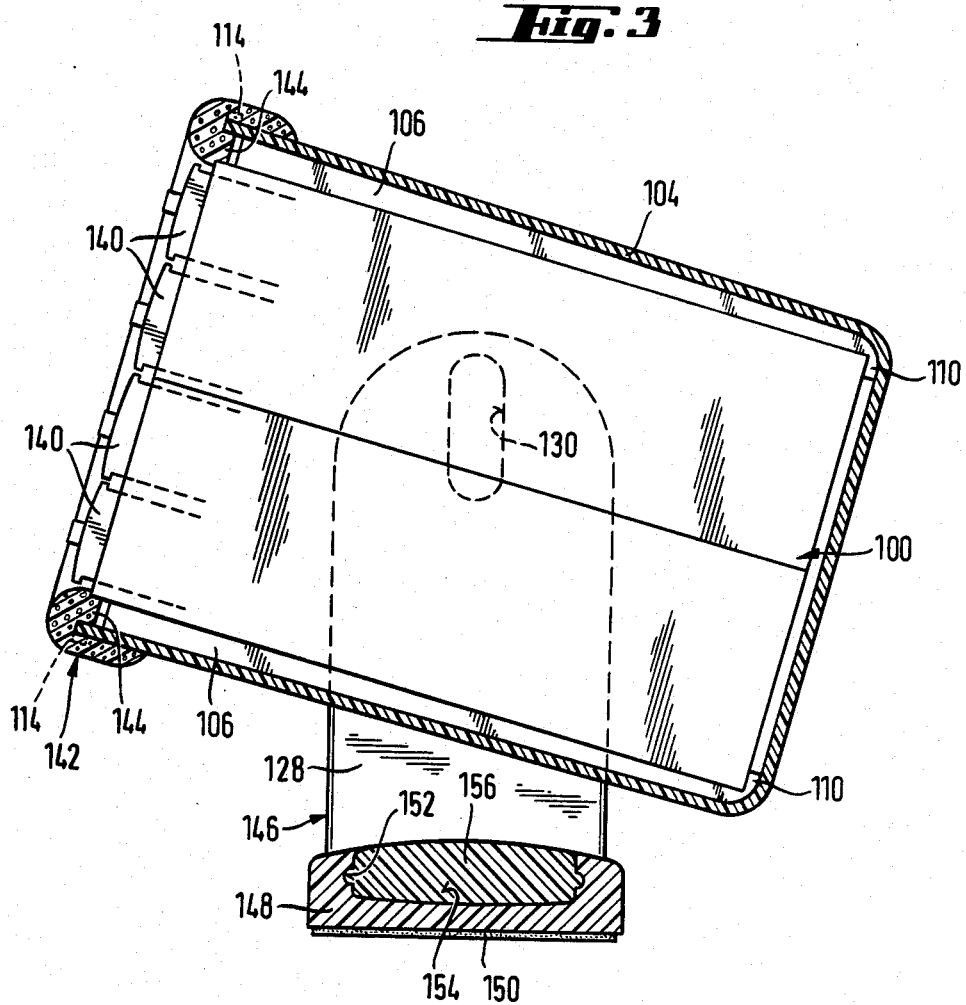

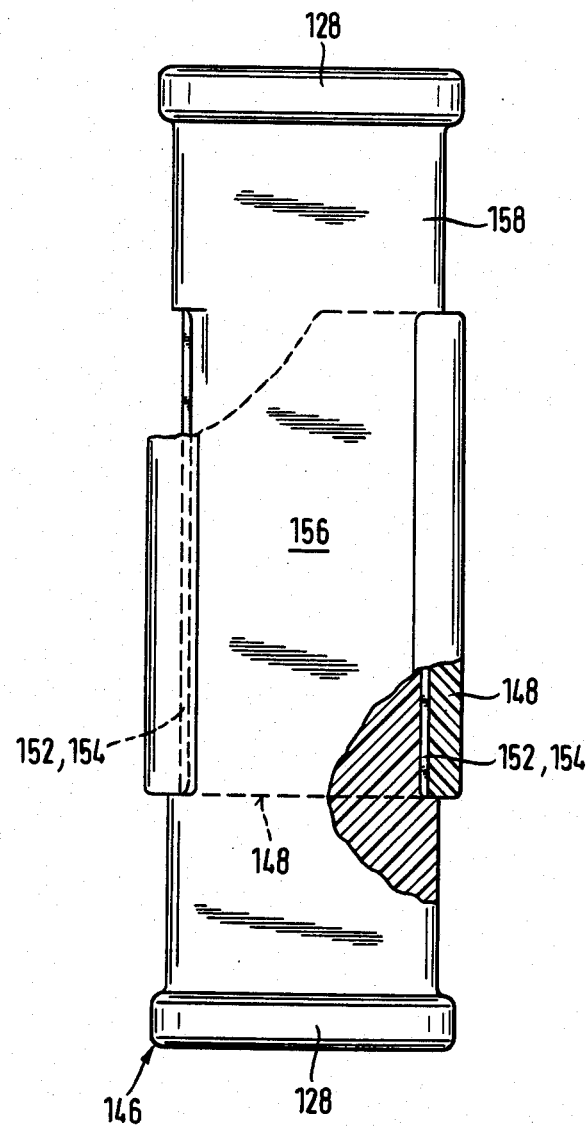

MAGAZINE FOR SOUND RECORDING MEDIA

BACKGROUND OF THE INVENTION (1) Field of the Invention:

The present invention relates to the storage of sound recording media. More specifically, this invention is directed to a magazine for sound recording media which is intended for mounting in a motor vehicle and especially to an impact-protected magazine which may be mounted with a desired orientation. Accordingly, the general objects of the present invention are to provide novel and improved methods and articles of such character.

(2) Description of the Prior Art

Magazine for storing recording media such as tape cassettes, microcassettes, compact discs and the like are known in the art. Such magazines will typically be provided with a plurality of slide members which receive the sound recording media. The prior magazines generally have a housing with a cuboid shape. The slide members will be spring biased for ejection from the magazine housing upon release of individual latch mechanisms so as to present a selected cassette or disc for insertion in the sound producing, i.e., playback, apparatus.

The design of magazines of the type briefly and generally described above presents particular problems when motor vehicle installation is contemplated. These problems include those presented by the need to provide some protection for the occupants of the vehicle from injury upon impact on the magazine, the need to provide protection to the magazine and its contents from damage in the case of sudden breaking maneuvers and/or accidents and the need to permit installation of the magazine in different orientations as dictated by the space available within the vehicle.

In the prior art the rear side of the housing of the magazine was typically provided with a cover which, in turn, was provided with a pattern of insertion openings. The prior magazines also included a support which had, articulated thereto, a connecting member which could be locked into the openings in the housing cover. Thus, depending upon which insertion openings were chosen, the prior magazine could be mounted in various positions in the vehicle by attaching the support, for example by means of mechanical fasteners or an adhesive, to a surface in the vehicle. In order to provide the necessary protection against injury and damage resulting from impact, it has been conventional prior art practice to provide a covering of polyurethane foam at least on the outer surface of the housing in the side portions thereof which extend between the rear cover and the front of the magazine, access to the slider members being obtained through the front of the magazine housing. While the provision of some means to absorb impact is necessary, the manufacture of a foam cover of the type which characterized the prior art was difficult and, because the manufacturing difficulty and the cost of the material, such coverings are relatively expensive.

SUMMARY OF THE INVENTION

The present invention overcomes the above-briefly discussed and other deficiencies and disadvantages of the prior art by providing an impact-protected magazine which is less complicated and thus less expensive when compared to the prior art. A magazine in accordance with the present invention is characterized by a frame or outer housing comprised of a hard, impact resistant material. An inner housing or housings, which contain the recording media receiving slider members, is mounted within the outer housing and spaced from the inner surface of the periphery defining walls thereof by a plurality of ribs which are integral with the outer housing. A magazine in accordance with the invention also includes a cap member which extends around the front edge of the magazine and covers the gap between the inner and outer housings which is defined by the ribs. This cap member is formed from an impact absorbing resilient material. The cap member covers all of the front edges of the magazine, these front edges having relatively sharp contours and constituting the regions of the magazine which are most likely to produce injury in the case of an impact. Accordingly, adequate cushioning is provided while the quantity requirements for the relatively expensive padding material are reduced.

A magazine assembly in accordance with a preferred embodiment of the invention, consisting of the slider members, the inner and outer housings and the impact absorbing cap, can be mounted in a desired angular orientation relative to an axis which passes through, or almost through, the center of gravity of the assembly. This is accomplished by the provision of support axis defining load bearing members on the side portions of the outer housing. The coupling of a support member, which is affixed to a mounting surface of a vehicle, to the load bearing members on the magazine outer housing is achieved by means of a yoke which engages the support member via a snap-type connection. Accordingly, the yoke and magazine may disengage from the support as a unit in the case of severe impact thereby further reducing the risk of injury to vehicle passengers. The yoke and load bearing members on the magazine outer housing cooperate to define a pair of rotatable connections whereby the angular orientation of the magazine may be manually selected. The arrangement of the present invention reduces the forces acting on the support member as a result of dead weight.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which:

FIG. 1 is an exploded perspective view of a magazine in accordance with the a first embodiment of the invention;

FIG. 2 is a diagrammatic side elevation view of the embodiment of FIG. 1;

FIG. 3 is a side elevation view, partly in section, of a magazine in accordance with a second embodiment of the present invention; and FIG. 4 is a diagramatic plan view of the yoke and support members of the embodiment of FIG. 3.

DESCRIPTION OF THE DISCLOSED EMBODIMENTS

With reference to FIGS. 1 and 2, a cassette receiving magazine half-housing which includes four slider members has been indicated generally at 100. The half-housing 100 is provided with covers or doors 102 which normally retain the slider members in the inserted position in half-housing 100. These doors may be opened by actuating the release buttons which are provided at the right sides thereof. Opening of the doors permits the slider members to be ejected by means of springs which are included in the half-housing 100. In the disclosed embodiment space is provided for a second half-housing 100 which, of course, would normally be present. The inner housing or half-housings, which include the slider members, do not comprise part of the present invention. The inner or half-housings 100 for the slider members can be unitary structures or can be assembled from several parts, i.e., each slider member could be provided with its own housing and these slider housings stacked within a frame or outer housing which has been indicated generally at 104.

While the inner housing or housings, i.e., the housings which include the slider members, are basically cuboid in shape, the outer housing or frame 104 is formed so as to have rounded, i.e., convex, corners and edges. The outer housing or frame 104 is provided, on the inside of its four side walls and extending generally from the front to the back thereof, with integral ribs 106. The ribs 106 are dimensioned such that the top surfaces thereof define an opening which receives and securely captures the half-housing or housings 100. As shown in FIG. 1 the ribs 106 extend rearwardly from and are perpendicular to the front edge 108 of the frame 104. As may be seen from FIG. 3, the ribs also continue inwardly, as indicated at 110, for at least a short distance along the closed rear wall of frame 104. The ribs 106 also preferably extend in a perpendicular direction relative to the side walls of frame 104 with which they are integral and may vary gradually in height from the front edge 108 to the back of frame 104.

A magazine in accordance with the present invention is also provided with a front cap 112. Cap 112 is pushed on to the front edge of frame 104 and is captured by a plurality of outwardly projecting tabs 114 provided about front edge 108 of frame 104. The cap 112 is formed from an impact absorbing resilient material, a polyurethane foam for example, and has an inwardly projecting circumferential flange 116. This flange is sufficiently wide so that it covers the gap, defined by ribs 106, between the side walls of frame 104 and the housing or housings 100 inserted therein. The flange 116, however, does not interfere with the ejection of the slider members in the inner housing or housings. Cap 112, accordingly, defines a padded frame around the insertion opening of frame 104.

The frame 104 is injected moulded from an impact-resistant plastic. A pair of axially aligned hubs, which extend outwardly from the opposite sides of frame 104, are formed during the moulding process. These hubs are defined by a plurality of members 118 which, because of their size and shape, have a certain degree of resiliency. The members 118 which define each hub engage complementary shaped recesses in the walls of opening 120 in a push-on block 122. This arrangement permits the frame 104 to be manually rotated relative to the pair of push-on blocks 122 upon resilient deflection of the hub defining members. The hub members 118 will, after rotation to the desired angular orientation, spring outwardly into the cooperating recesses in blocks 122 to fix the relative rotational position of the frame 104 and blocks 122 and thus define the orientation of frame 104. There will be no resilient deformation of the hub parts 118 once the desired orientation has been achieved.

The assembly comprising the housing(s) 100, the outer housing or frame 104, the padding cap 112 and the push-on blocks 122 is carried by a yoke which has been indicated generally at 124. The yoke 124 is substantially U-shaped and the base portion 134 thereof releasably engages holes 126 provided in a support member 127. One manner in which this engagement may be accomplished is best seen from FIG. 2. The support member 127 will be secured, for example adhesively or by mechanical fasteners, to a mounting surface in a vehicle. The manner of engagement of yoke 124 with support member 127 permits, for example in the case of a strong impact against the exterior of the magazine, the magazine and yoke to yield and separate from the support member which remains secured to the vehicle mounting surface.

The two opposed arms 128 of yoke 124 are hollow. These hollow arms are sized and shaped so as to function as guides for the push-on block 122. That is, the blocks 122 may be moved along the interior of arms 128 but are subjected to frictional restraint so that the movement will only be as desired not as a result of, for example, vibration. The facing sides of the arms 128 of yoke 124 are provided with a pair of parallel, elongated openings 130. The hubs, defined by the hub members 118, extend through the openings 130 to engage the push-on blocks 122.

In the interest of stability, and also for aesthetic reasons, the axis 119 defined by the hubs on frame 104 will normally be located adjacent the ends of the longitudinal holes 113 which are nearest to the base 134 of yoke 124. In order that all conceivable mounting conditions in a vehicle can be accommodated, however, the frame 104 must be capable of being rotated through an angle of least 90° relative to yoke 124. With axis 119 in the normal position, as depicted in FIG. 2, the above-described relative rotation of the hubs and blocks 122 through an angle of 90° would not be possible because, for example, the rear edge 132 of frame 104 would come into contact with the base 134 of yoke 124. Should such interference occur, the user need only slide the subassembly including the outer frame 104 upwardly as the apparatus is depicted in FIG. 2, rotate the hubs relative to the push-on blocks 122 to the desired orientation, and then push the frame 104 downwardly thus causing the blocks 122 to slide within arms 128 toward the plane of base 134. Thus, the elongated, parallel openings 130 in the yoke arms 128 permit the housing 104 to be slightly lifted away from the yoke base 134, for rotational adjustment between the hub 118 and the blocks 122.

Referring now to FIGS. 3 and 4, the same reference numerals have been employed to identify those elements which are substantially the same as elements of the embodiment of FIGS. 1 and 2. In the embodiment of FIGS. 3 and 4 the front walls 140 of the slider members are shown as having a different configuration when compared to the covers 102 of the embodiment of FIGS. 1 and 2. However, as in the embodiment of FIGS. 1 and 2, the specific design of the inner-housing or housings of the magazine does not comprise part of the invention. The cap 142 of the embodiment of FIGS. 3 and 4 has, as indicated at 144, an extension which is pressed into the gap, defined by ribs 106, between the inner and outer housings. In order for the gap which receives the extension 144 of the padded cap 142 to be present, the ribs 106 will terminate a short distance inwardly with respect to the front edge of frame 104.

A further distinction between the embodiment of FIGS. 1 and 2 and that of FIGS. 3 and 4 resides in the manner of establishing a break-away connection between the support 148 and the yoke which has been indicated generally at 146. In the embodiment of FIGS. 3 and 4 the support 148 is provided, on its upper side, with a groove 154 which is undercut as indicated at 152. The central portion 156 of the base 158 of yoke 146 is shaped so as to be complementary in size and shape to the groove 154 whereby the yoke may be snapped into the support. In the embodiment of FIGS. 3 and 4 the support is shown as being provided with an adhesive film 150 for purposes of mounting the support to a surface in a vehicle.

While preferred embodiments have been shown and described, various modifications may be made thereto without departing from the spirit and scope of the invention. Accordingly, it is to be understood that the present invention has been described by way of illustration and not limitation.

What is claimed is:

1. A magazine for use in the storage of sound recording media comprising:
    at least first inner housing means, said inner housing means having a generally cuboid exterior shape and including within the cuboid exterior at least first movable slider means, said slider means being configured to receive and support sound recording media in said inner housing means;
    support means, said support means being intended for affixation to a mounting surface;
    means defining an outer housing, said outer housing having four side walls, said outer housing defining means further including a plurality of spatially displaced integral ribs extending inwardly from each of said side walls, said ribs having generally flat top surfaces which cooperate to define a cuboid inner housing receiving space in said outer housing defining means, said first inner housing means being secured in said space by contact with the top surfaces of said ribs on at least three of said side walls, said outer housing defining means also having an insertion opening at a first end thereof, said insertion opening being framed by first edges of each of said side walls, said ribs extending along said side walls in directions which are generally transverse to a plane defined by said side wall first edges;
    cap means, said cap means extending about the periphery of said outer housing defining means insertion opening, a portion of said cap means extending inwardly in a direction transverse to said outer housing defining means side walls at least to the height of said integral ribs, the spaces between said outer housing defining means integral ribs about said insertion opening being covered by said cap means; and
    means for mounting said outer housing defining means on said support means.

2. The apparatus of claim 1 wherein said cap means is comprised of an impact absorbing material.

3. The apparatus of claim 2 wherein said cap means material is resilient and said cap means is stretched on to said outer housing defining means about said insertion opening.

4. The apparatus of claim 2 wherein said ribs terminate at first ends at points displaced inwardly from said side wall first edges and wherein said cap means extends into said outer housing defining means in the direction of said rib first ends so as to be in part located between said inner housing means and said outer housing defining means.

5. The apparatus of claim 2 wherein said cap means includes a circumferential recess at the inwardly facing side thereof said circumferential recess being complementary in shape to the insertion end of said outer housing defining means whereby said cap may be fitted on said outer housing defining means.

6. The apparatus of claim 5 wherein said outer housing defining means further comprises a rear wall which interconnects said side walls, said rear wall being disposed oppositely with respect to said insertion opening.

7. The apparatus of claim 1 wherein said outer housing defining means further comprises a rear wall which interconnects said side walls, said rear wall being disposed oppositely with respect to said insertion opening.

8. The apparatus of claim 1 where said support means comprises:
    hub means, said hub means being integral with said outer housing defining means, said hub means defining an axis which is parallel to a plane defined by said outer housing defining means side wall first edges; and
    yoke means for affixation to a mounting surface and for engagement of said hub means, said hub means and said yoke means being relatively rotatable about said axis.

9. The apparatus of claim 8 wherein said axis extends approximately through the center of gravity of the combination of said inner housing means, outer housing defining means and cap means.

10. The apparatus of claim 8 wherein said yoke means comprises:
    a pair of oppositely disposed generally parallel arms;
    a base interconnecting said arms at first ends thereof; and
    means for establishing a rotatable connection between said arms and said hub means.

11. The apparatus of claim 10 wherein said yoke means base and said support means cooperate to define a releasable snap-type mechanical connection.

12. The apparatus of claim 11 wherein said yoke means arms are hollow and are provided with hub means receiving openings in facing sides thereof and wherein said rotatable connection establishing means comprises:
    block means, said block means being positioned within said yoke means hollow arms, said block means each defining a hub means receiving recess with peripheral surface irregularities.

13. The apparatus of claim 12 wherein said hub means each comprises:
    a plurality of members integral with and extending outwardly from said outer housing defining means, said hub members being resilient and in part being complementary in shape to said block means recess surface irregularities whereby rotation of said block means relative to said hub means is permitted in steps defined by the circumferential spacing between said hub defining members and said surface irregularities.

14. The apparatus of claim 13 wherein said hub receiving openings in said yoke means arms are elongated and parallel whereby housing defining means may be moved away from said yoke means base member to permit rotational adjustment between said hub means and block means.

15. The apparatus of claim 14 wherein said outer housing defining means further comprises:
a plurality of outwardly extending tabs located adjacent said insertion opening, said tabs engaging complementary recesses in said cap means to secure said cap means to said outer housing defining means.

16. The apparatus of claim 14 wherein said outer housing defining means is injection molded from an impact-resistant hard plastic material.

17. The apparatus of claim 14 wherein said cap means is formed from a foam material.

18. The apparatus of claim 14 wherein said cap means is comprised of an impact absorbing material.

19. The apparatus of claim 18 wherein said cap means includes a circumferential recess at the inwardly facing side thereof, said circumferential recess being complementary in shape to the insertion end of said outer housing defining means whereby said cap may be fitted on said outer housing defining means.

20. The apparatus of claim 18 wherein said outer housing defining means further comprises a rear wall which interconnects said side walls, said rear wall being disposed oppositely with respect to said insertion opening.

21. A magazine for use in the storage of saound recording media comprising:
at least first inner housing means, said inner housing means having a generally cuboid exterior shape and including within the cuboid exterior at least first movable slider means, said slider means being configured to receive and support sound recording media in said inner housing means;
support means, said support means being intended for affixation to a mounting surface;
means defining an outer housing, said outer housing defining means having four curved side walls, said outer housing defining means further including a plurality of spatially displaced integral ribs extending inwardly from each of said side walls, said ribs having generally flat top surfaces which cooperate to define a cuboid inner housing receiving space in said outer housing defining means, said first inner housing means being secured in said receiving space by contact with the top surfaces of said ribs on at least three of said side walls, said outer housing defining means also having an insertion opening at a first end thereof, said insertion opening being framed by first edges of each of said side walls, said ribs extending along said side walls in directions which are generally transverse to a plane defined by said side wall first edges;
cap means, said cap means formed of a resilient pad material, said cap means covering said first edges of said side walls and extending inwardly to cover at least a portion of each integral rib;
means for mounting said outer housing defining means on said support means.

* * * * *